US007232614B2

(12) United States Patent
LeClaire

(10) Patent No.: US 7,232,614 B2
(45) Date of Patent: Jun. 19, 2007

(54) TUNGSTEN DISULFIDE SURFACE TREATMENT

(75) Inventor: Craig T. LeClaire, Stillman Valley, IL (US)

(73) Assignee: Material Technologies, Inc., Rockford, IL (US)

(*) Notice: Subject to any disclaimer, the term of this patent is extended or adjusted under 35 U.S.C. 154(b) by 0 days.

(21) Appl. No.: 11/154,460

(22) Filed: Jun. 16, 2005

(65) Prior Publication Data

US 2005/0244574 A1 Nov. 3, 2005

Related U.S. Application Data

(62) Division of application No. 10/263,477, filed on Oct. 3, 2002, now Pat. No. 6,977,096.

(51) Int. Cl.
*B32B 15/02* (2006.01)

(52) U.S. Cl. ...................... 428/612; 428/639; 428/570; 428/687

(58) Field of Classification Search ................ 428/612, 428/639, 570, 687
See application file for complete search history.

(56) References Cited

U.S. PATENT DOCUMENTS

| | | | |
|---|---|---|---|
| 3,100,724 A | | 8/1963 | Rocheville |
| 3,632,368 A | | 1/1972 | Nelson |
| 3,765,923 A | | 10/1973 | Bender-Christensen |
| 3,768,210 A | | 10/1973 | Johnson et al. |
| 4,025,419 A | | 5/1977 | Musschoot |
| 4,067,150 A | | 1/1978 | Merrigan |
| 4,415,444 A | | 11/1983 | Guptail |
| 4,562,791 A | | 1/1986 | Porter et al. |
| 4,733,503 A | | 3/1988 | Gallant et al. |
| 5,035,089 A | | 7/1991 | Tillman et al. |
| 5,099,619 A | | 3/1992 | Rose |
| 5,230,815 A | * | 7/1993 | Rountree .................... 508/108 |
| 5,299,694 A | | 4/1994 | Rambaud |
| 5,562,531 A | | 10/1996 | Yamaharu |
| 5,592,840 A | * | 1/1997 | Miyasaka ...................... 72/53 |
| 5,947,800 A | | 9/1999 | Fring |
| 5,974,920 A | | 11/1999 | Matsuo |
| 6,190,235 B1 | | 2/2001 | Csabai et al. |
| 6,213,692 B1 | | 4/2001 | Guehring et al. |
| 6,238,268 B1 | | 5/2001 | Wern |
| 6,323,264 B1 | | 11/2001 | Nazaryan et al. |

(Continued)

OTHER PUBLICATIONS

Ogando, Joseph, *Less Friction, More Speed, A New Coating Helps Professional Racers Get the Most Out of Their Cars*, Design News, 2 pages, Feb. 2002, indicating reprint from Design News, dated Dec. 3, 2001.

(Continued)

*Primary Examiner*—Fred J. Parker
(74) *Attorney, Agent, or Firm*—Reinhart Boerner Van Deuren P.C.

(57) ABSTRACT

A tungsten disulfide metal surface treatment in which the substrate material is prepared through impingement of small blast media particle sizes to create formed pockets in the substrate material approximately matched to the size of the tungsten disulfide particles. A sand blast apparatus having a vibratory bowl with a throttled intake pipe enables small blast media particles to be used to prepare the substrate surface with the formed pockets. A method for forming the tungsten disulfide surface treatment through roughening the substrate surface in a controlled manner is disclosed.

18 Claims, 10 Drawing Sheets

U.S. PATENT DOCUMENTS 6,713,535 B2 3/2004 Orkin et al.

OTHER PUBLICATIONS

*New Coating System Sweeps Racing Industry*, Product Design and Development website pp. 1-3, Feb. 22, 2002.

Elmore, Chad, *Friction Reduction Coating Creates Slippery Surface Without Harm*, OEM Off-Highway, pp. 56, 57, Jul. 2002.

*MicroBlue High Performance Coating System*, Material Technologies, Inc. brochure, undated.

Ogando, Joseph, *MicroBlue at a Glance*, Design News, 3 pages, dated Dec. 3, 2001.

Supplemental Statement for Information Disclosure Statement (1 page).

* cited by examiner

TUNGSTEN DISULFIDE SURFACE TREATMENT

CROSS-REFERENCE TO RELATED PATENT APPLICATIONS

This patent application is a divisional of U.S. patent application Ser. No. 10/263,477 filed Oct. 3, 2002, which is now U.S. Pat. No. 6,977,096.

FIELD OF THE INVENTION

This invention pertains to tungsten disulfide surface preparation and coating treatments for various substrate materials and more specifically to tungsten disulfide surface coating treatments and methods and apparatus for preparing a substrate material for receipt of tungsten disulfide particles.

BACKGROUND OF THE INVENTION

Tungsten disulfide ($WS_2$) is a known dry-film lubricant that was developed for NASA by Stanford University in the 1960's. Following its initial debut, tungsten disulfide found its way into industrial applications. Tungsten disulfide is known to improve wear properties and to enhance lubricity. It also has an affinity for lubricants, resulting in oil-retention properties in "wet" applications.

Tungsten disulfide is commercially available as a powder that comprises finely divided tungsten disulfide particles with a mean particle size ranging between about 1 micron and about 3 micron, depending upon the commercial supplier. Tungsten disulfide adheres to a substrate surface through a molecular/mechanical interlock and takes on the characteristic of the substrate regardless of whether the substrate is ferrous, non-ferrous, a composite, carbide or plastic. When applied to a substrate material, tungsten disulfide also forms a very thin layer due to the fact that it does not bond to itself. As a result, the dimensions and tolerances of treated parts are not compromised or appreciably affected when a substrate is treated with tungsten disulfide. Further, these aspects of tungsten disulfide prevent chipping, flaking or contamination problems.

Known methods for applying tungsten disulfide include burnishing and various spray-on techniques. One known method of applying tungsten disulfide that has been used is high velocity impingement such as through air blasting tungsten disulfide over a substrate surface.

Prior to the present invention, the present inventor found it desirable to clean or prepare the substrate surface for better tungsten disulfide retention such as through blasting the substrate material with suitable blast media such as aluminum oxide or silicon carbide. Conventional sand blasting equipment and techniques allowed the present inventor to operate with blast media particle grit sizes of up to 400 grit size but not higher grit numbers (larger grit size numbers equal smaller sand blast particle sizes).

Based on various recent observations made after the making of the present invention, the typical prior process of preparing or cleaning the substrate surface with 400 grit size blast media (or larger blast media particle size having a smaller grit number) is believed to have resulted in a tungsten sulfide treated substrate surface that is represented in FIG. 1, which is an idealized schematic representation of a cross section of a treated surface. This treated surface 10 has formed pockets 12 in the substrate 13 that are created as a result of the sand blast process which are then filled with tungsten disulfide particles 14. As will be appreciated upon an understanding of the present invention, this type of treatment has deficiencies and does not maximize the full potential of tungsten disulfide.

When higher grit numbers of up to about 800 grit, were experimented with and attempted by the present inventor (i.e. smaller particle sizes) the blast media would cake up in the sand blast hopper due to its small size. Attempts at experimenting with higher grit numbers to allow use of smaller particle sizes included banging on the walls of the media collection hopper or vibrating the hopper wall. However, these attempts resulted in substantially uneven flow of blast media in which the density of blast media sent to the sand blast gun would increase dramatically when the caked blast media periodically collapsed to the bottom of the hopper. Likewise, there would be a notable absence of blast media through the media intake at the bottom of the hopper while the blast media was caked up in the sand blast hopper. When the blast media collapsed down, this increased the blast media density sent to the gun and thereby lowered the impingement velocity. This would also create a thick cloud of blast media in the blast cabinet that would severely impair or eliminate visibility of the workpiece, thereby making work on the workpiece difficult or impossible. When the blast media caked up, the blast media intake was often substantially free of blast media and sucking air which decreased the blast media density sent to the gun and likely increased the impingement velocity. The uneven media flow caused a substantially uneven prepared surface on the substrate surface. Some portions of the substrate would be blasted at very high velocities and low blast particle densities which are believed to create deep pockets in combination with missed areas or unprepared surface areas over the substrate surface, while other portions of the substrate would be blasted at lower velocities and high blast particle densities which are believed to create very shallow pockets over the substrate surface. As a result the prepared surface is now believed to have had a variable surface characteristic which in turn created an inconsistent tungsten disulfide surface treatment with different surface characteristics at different areas over the treated area.

BRIEF SUMMARY OF THE INVENTION

It is the general aim of the present invention to provide a tungsten disulfide surface treatment which is more effective than those achieved in the past.

According to one aspect of the present invention, a tungsten disulfide surface treatment for an entire selected area of a substrate material is provided that utilizes tungsten disulfide particles of a predetermined average size and a specially prepared substrate surface. The tungsten disulfide surface treatment includes an underlying prepared substrate surface formed in the substrate material. The prepared substrate surface has formed pockets with an effective depth substantially matched to or smaller than the predetermined average size of the tungsten disulfide particles over substantially the entire selected area. A tungsten disulfide layer formed of individual tungsten disulfide particles is filled into the formed pockets over the entire selected area of the substrate material.

According to another aspect of the present invention, a tungsten disulfide surface treatment for an entire selected area of a substrate material is provided that utilizes tungsten disulfide particles of a predetermined average size and a controllably roughened substrate surface. The tungsten disulfide surface treatment includes a roughened substrate surface formed in the substrate material, in which the roughened surface has an average roughness characteristic over the entire selected area of less than about 10 microinches as measured by a 5 micron radius tipped profolometer. A tungsten disulfide layer formed of the tungsten disulfide particles is filled into the roughened substrate surface over the entire selected area of the substrate material.

According to another aspect of the present invention, a new method is provide for coating an entire selected surface of a substrate material with tungsten disulfide particles of a predetermined average size. The method comprises controllably forming pockets of an average effected depth over the entire selected surface of the substrate material such that average effective depth of the pockets are matched to be about equal or smaller than the predetermined average size of the tungsten disulfide particles. Once the pockets are formed, the pockets are filled with the tungsten disulfide particles having particle sizes which correspond to the size of the pockets.

According to another aspect of the present invention, a new method is provide for coating an entire selected surface of a substrate material with tungsten disulfide particles of a predetermined average size. The method comprises roughening the entire selected surface of the substrate material to form a roughened surface with pockets over the entire selected surface of the substrate material such that the roughened surface has an average roughness characteristic of less than about 10 microinches as measured by a 5 micron radius tipped profolometer. Once the surface is roughened, the pockets in the roughened surface are filled with the tungsten disulfide particles.

According to another aspect of the present invention, a new method is provide for coating an entire selected surface of a substrate material with tungsten disulfide particles of a predetermined average size. The method comprises controllably blasting the substrate material with a blast media of greater than 400 grit number and of consistent density and velocity to form a roughened surface with formed pockets over the entire selected surface of the substrate material. The method also comprises impinging the entire selected surface of the substrate material with the tungsten disulfide particles to fill the pockets with the tungsten disulfide particles.

According to another aspect of the present invention, a blasting machine is provided for impinging workpieces with a blast media carried by a pressurized carrier gas that enables the improved tungsten disulfide surface treatment and method of the present invention. The blasting machine includes: a collection hopper adapted to receive the blast media, the hopper having an outlet; a vibratory bowl connected to the outlet of the collection hopper; a vibrator acting upon the vibratory bowl, the vibrator having an operational mode that vibrates the vibratory bowl; an intake conduit having at least one first inlet exposed to the inside of the vibratory bowl for receiving blast media; and a spray gun device adapted to spray workpieces with blast media, the spray gun device having a first input connected to the intake conduit and a second input adapted to receive the pressurized carrier gas, the spray gun having a nozzle arranged therein such that flow of pressurized carrier gas through the spray gun suctions and draws blast media through the intake conduit.

DETAILED DESCRIPTION OF THE INVENTION

Figures 1, 2, 3:
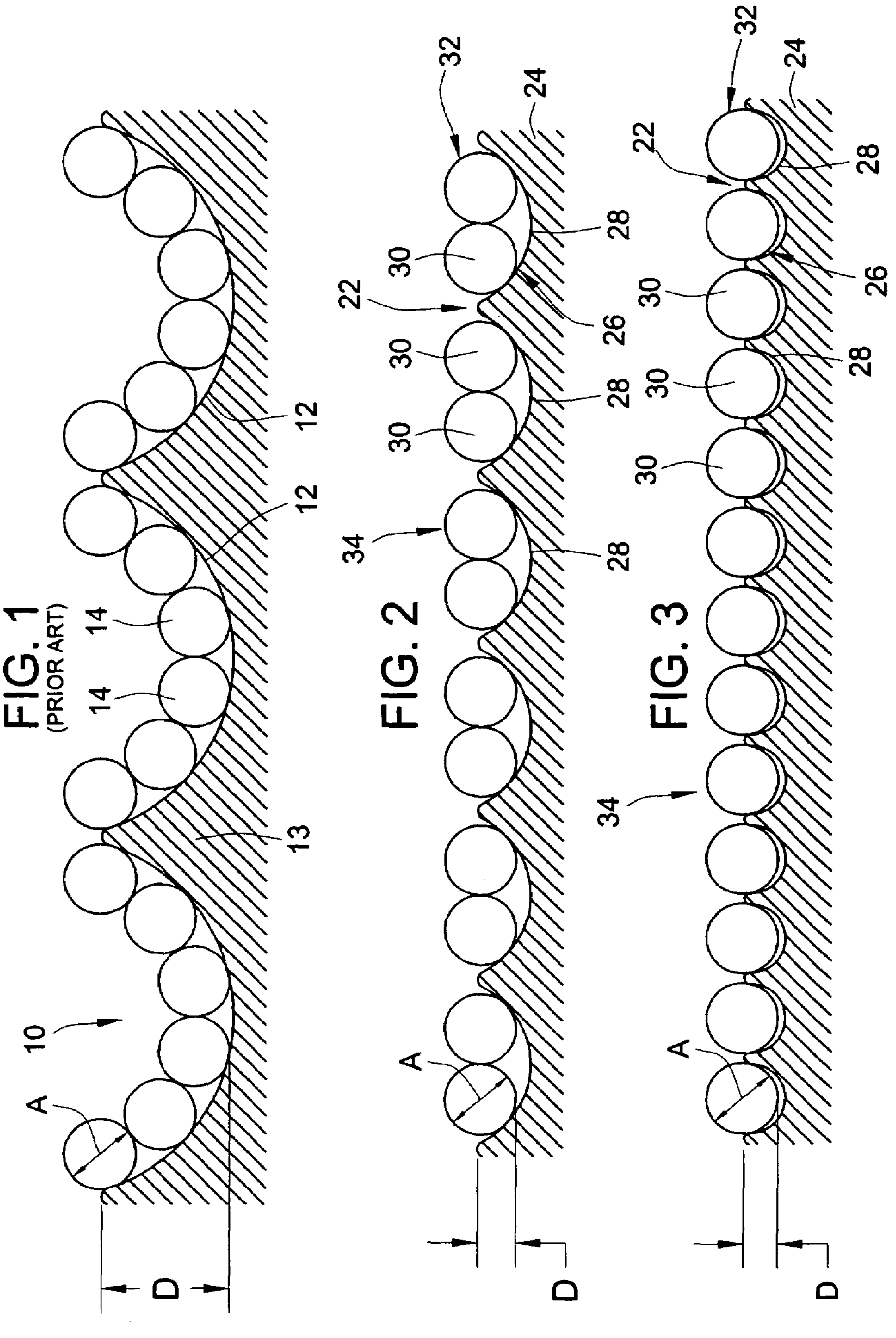
FIG. 1 (PRIOR ART)
FIG. 1 is an idealized schematic representation of a cross section of a tungsten disulfide treated surface according to the prior art.
FIG. 2 is an idealized schematic representation of a cross section of a tungsten disulfide treated surface according to one embodiment of the present invention.
FIG. 3 is an idealized schematic representation of a cross section of a tungsten disulfide treated surface according to another embodiment of the present invention to illustrate that some or all of the pockets can also receive more than a single particle.

The following disclosure further illustrates the invention but, of course, should not be construed as in any way limiting its scope.

A sand blasting machine 20 according to an embodiment of one aspect of the present invention has enabled commercial use of blast media grit numbers of greater than 400 (i.e. smaller media particles). The sand blasting machine 20 provides substantially consistent even flow of blast media capable to the gun which can be sprayed over the entire selected substrate surface area 22 of a substrate material 24 to achieve a prepared surface 26 with a substantially consistent surface characteristic across the entire selected substrate surface area 22. According to another aspect of the present invention, the substrate surface area 22 is impinged with smaller blast media particle sizes (i.e. higher grit numbers) to create much smaller more optimum sized formed pockets 28 in the substrate material 24. When the prepared surface 26 is impinged with tungsten disulfide particles 30, a more desirable tungsten disulfide layer 32 is created over the substrate material 24 to minimize friction and increase lubricity.

FIGS. 2 and 3 are idealized schematic representations of tungsten disulfide surface treatments included for purposes of generating a greater understanding of the present invention. Referring to FIGS. 2 and 3, the smaller formed pockets 28 are believed to more closely correspond in depth to the size of each tungsten disulfide particle 30. Each pocket 28 ideally has an effective depth D (e.g. where the tungsten disulfide particle bottoms out) that may be about equal to or smaller than the average diameter A of each tungsten disulfide particle 30. Once the prepared surface is coated with tungsten disulfide particles 30, and recalling that tungsten disulfide typically does not bond to itself, the resulting tungsten disulfide layer 32 has a thickness that approaches being equal to about one tungsten disulfide particle 30. This provides an advantage that a majority of individual tungsten disulfide particles 30 project partially from each of the pockets 28. With this surface preparation technique, the substrate material 24 (such as exposed substrate areas between pockets) advantageously remains substantially below the layer of tungsten disulfide particles 30 minimizing the likelihood of exposure of the substrate material.

The shallow pockets 28 idealized in schematic form in FIGS. 2 and 3 are in contrast to the idealized schematic idealization of FIG. 1 where tungsten disulfide particles are often fully submerged within the deeply formed pockets 12. In FIG. 1, a majority of the tungsten disulfide particles 14 do not form part of the outermost sliding surface which leaves a much greater exposure of portions of the substrate 13 between pockets 12 which can form part of the outermost sliding surface and diminish the benefits of tungsten disulfide.

As indicated from the foregoing, the method for preparing the substrate surface area 22 according to an embodiment of the present invention includes matching the size or depth of the pockets 28 to the average size of the tungsten disulfide particles 30 such that the pockets 28 have a depth about equal to or smaller than the average size of the tungsten disulfide particles 30. Once the size of the tungsten disulfide particle to be used in the surface treatment is known, the remainder of the parameters including the size of the blast media used to prepare the substrate surface area 22 and various parameters for operating the sand blast machine 20 can be determined. It will be readily appreciated that the hardness and material characteristics of the substrate material 24 being treated will affect the operating parameters. Different types of typical substrate materials include: low hardness ferrous materials (0–25 HRC); medium hardness ferrous materials (26–45 HRC); high hardness ferrous materials (46–70 HRC); low hardness stainless steel; high hardness stainless steel; aluminum and aluminum alloys; copper and copper alloys; brass or bronze and brass or bronze alloys; inconel; carbides, plastics, composite materials, glass, and fiberglass. However, this list is not exhaustive and the process may be used on other such substrate materials as are commercially available.

Currently, a preferred embodiment of the treatment process used by the inventor uses a tungsten disulfide compound with a mean tungsten disulfide particle size of 1 micron, although other embodiments may use other suitable particle sizes. The process for matching the average sizes of tungsten disulfide particles and formed pockets is accomplished through preparing a sample flat substrate surface with different sizes of grit numbers of a selected blast media and then measuring the roughness of the substrate surface. Running a profolometer having a 5 micron radius probe tip (200 microinches) over the prepared substrate surface at several locations and taking a statistical average (to weed out aberrations which will typically occur in most substrate surfaces) is currently the preferred method for measuring surface roughness. A profolometer provides an average readout of the vertical distance of profolometer tip movement as the profolometer travels over the peaks and valleys of the roughened surface (e.g. a value not equal to formed pocket depth, but which provides a number that correlates to pocket depth). Using this methodology, an average profolometer readout (regardless of substrate material) should be less than about 10 microinches, and more preferably between about 2 microinches and about 5 microinches to provide the desired roughened surface characteristic for receipt of tungsten disulfide particles (given a selected tungsten disulfide power having an average particle size of 1 micron).

For example, tests to establish operating parameters for one substrate material were performed on a flat surface samples of a medium-alloy 4140 steel (with a hardness of 30 HRC) in which profolometer readings were taken for prepared flat substrate samples using 240, 400, 800 & 1200 grit aluminum oxide media, respectively. The radius of the probe tip used was 200 microinches or 5 microns. In the blasting machine used, line pressure was 150 psi, with a 0.125" air jet with a 0.250" nozzle diameter impacting the workpiece in a perpendicular fashion at a distance of 3" for 2 sec. in duration. The mathematical average of multiple profolometer readings taken across each test sample were as follows:

TABLE 1

| Grit Size | Average Profolometer Reading (microinches) |
|---|---|
| 240 | 29 |
| 400 | 15 |
| 800 | 8 |
| 1200 | 4 |

Based on these test results, the most preferable grit size of aluminum oxide media for medium-alloy 4140 steel (with a hardness of 30 HRC) would be 1200 grit based on the preferred range of about 2–5 microinches (with given the operating parameters of the blast machinery being fixed).

Figure 4:
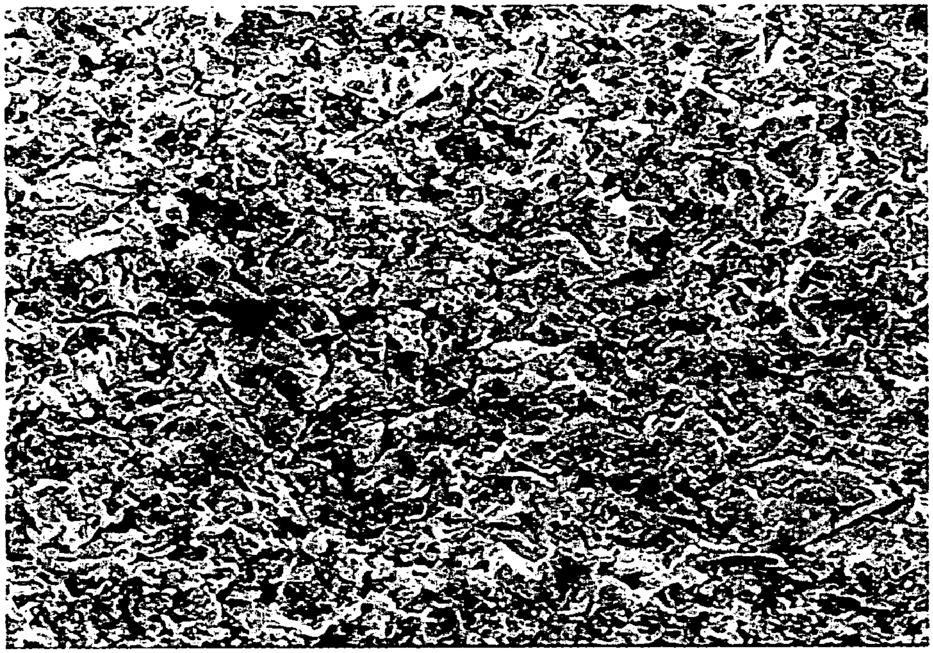
FIG. 4 is an actual microscopic image of a blasted ferrous material substrate surface using 240 grit aluminum oxide media at 500 microscopic power, for purposes of comparison with FIG. 5.
Figure 5:
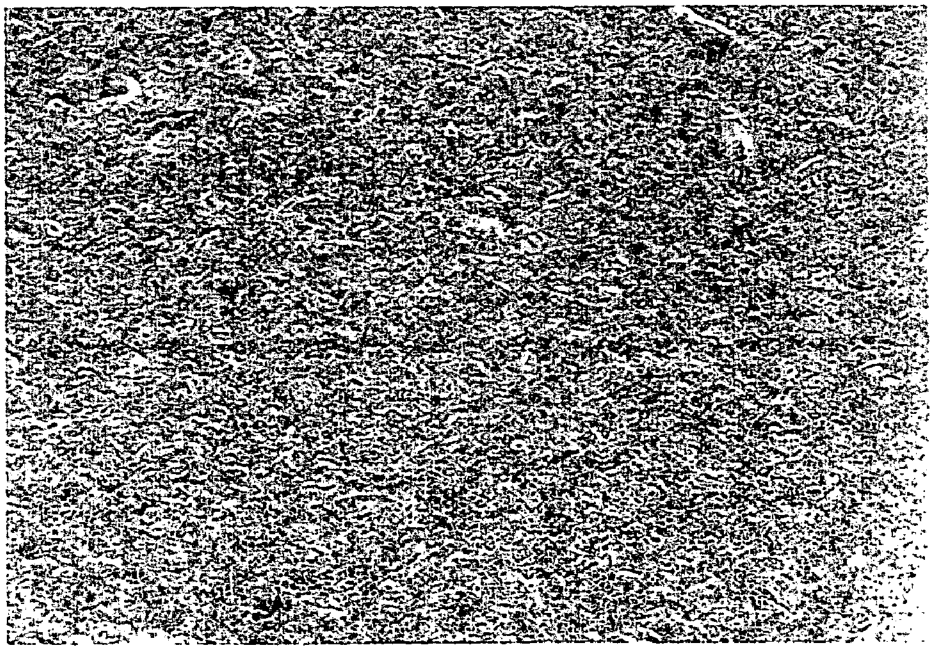
FIG. 5 is an actual microscopic image of a blasted ferrous material substrate surface using 1200 grit aluminum oxide media at 500 microscopic power, according to the teachings of the present invention.
Figure 6:
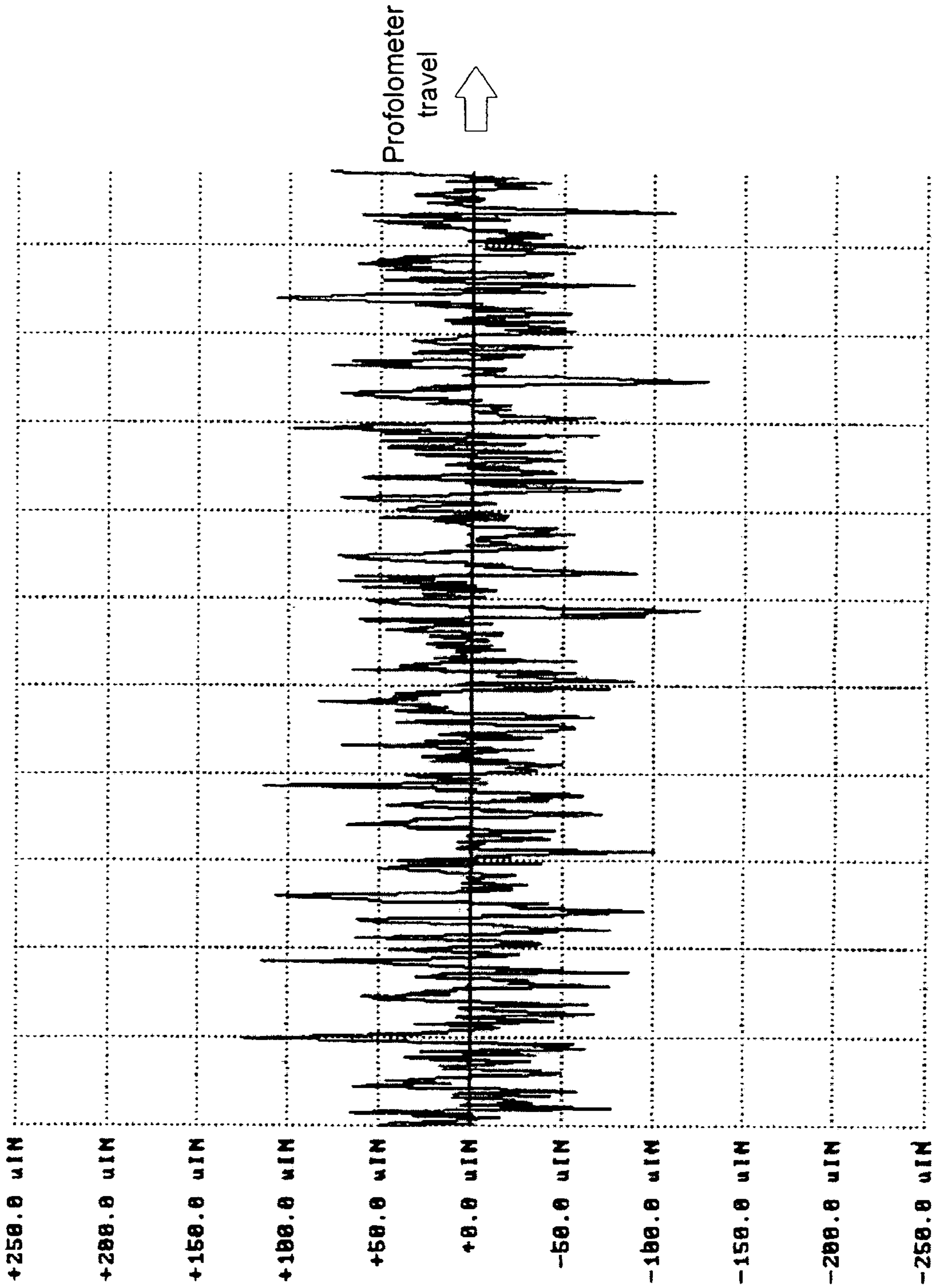
FIG. 6 is a surface roughness chart measured by a 5 micron radius tipped profolometer (one pass only) for the 240 grit blasted ferrous material substrate surface shown in FIG. 4.
Figure 7:
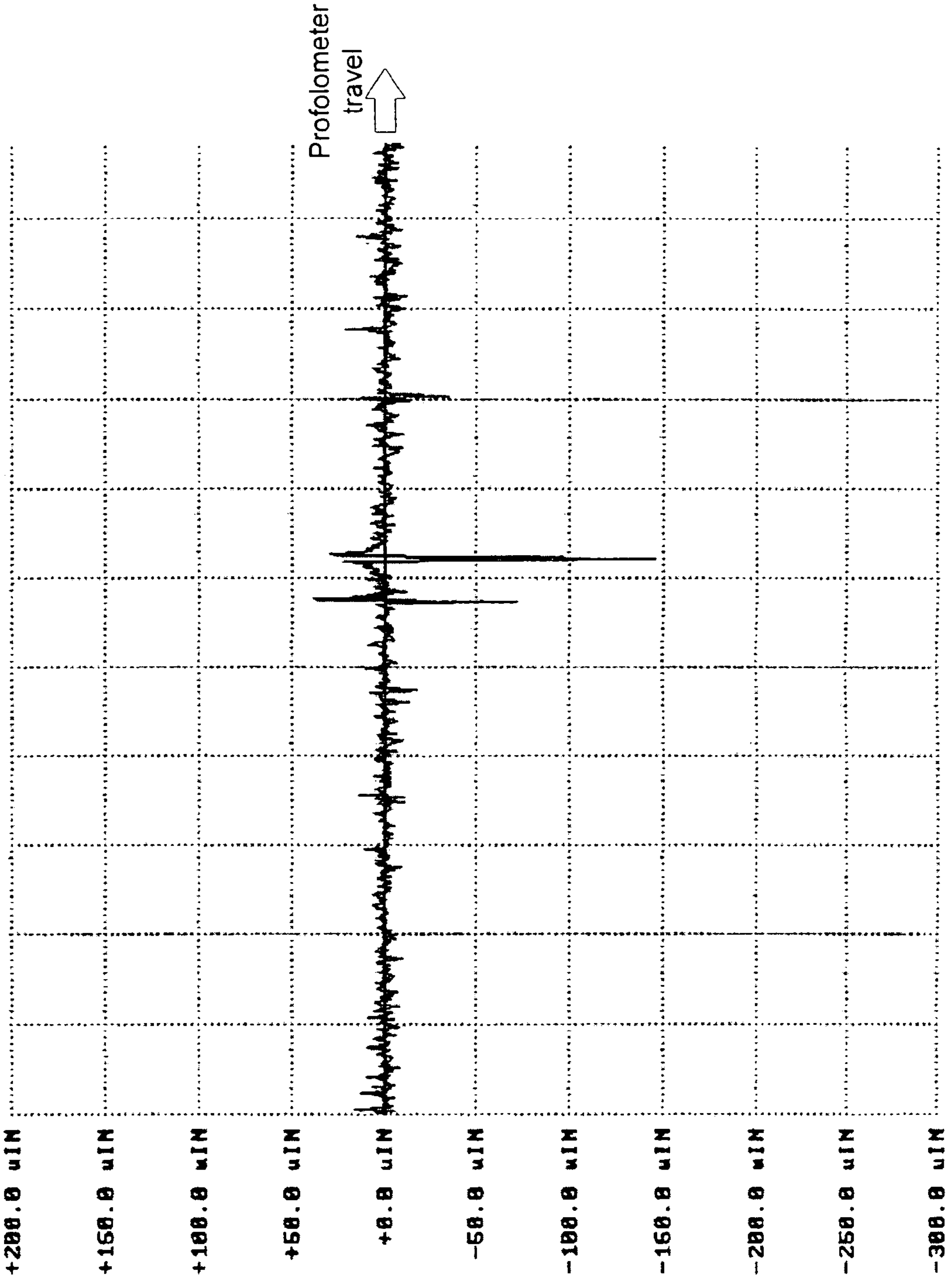
FIG. 7 is a surface roughness chart as measured by a 5 micron radius tipped profolometer (one pass only) for the 1200 grit blasted ferrous material substrate surface shown in FIG. 5.

The surface characteristics of two fo the blasted substrate surfaces used in the example above are illustrated in FIGS. 4 and 5, which are actual photographic images (taken at 500 microscopic power) of the 240 grit blasted substrate surface and the 1200 grit blasted surface, respectively. The pocket size differences and roughness differences in the substrate surfaces quantified in Table 1 above is readily apparent in these photographic images. As can also be seen in these photographic images, deformations and other aberrations in the roughened substrate surface will typically occur, as substrate material surfaces are not perfectly flat, and blasting is often manual and not a perfect science, which is why average numbers are used. To illustrate this, FIGS. 6 and 7 are provided, which graph the vertical movement of the profolometer tip as it runs horizontally over the 240 grit and 1200 grit blasted substrate surfaces, respectively. Surface aberrations (e.g. such as from surface scratches) in the blasted substrate surface are readily apparent from graphs illustrated in FIGS. 6 and 7. As a result, about 10–15% of the higher and lower profolometer readings can be ignored as mere surface aberrations.

There are other parameters that can be varied in the blasting process to affect the resulting surface roughness of the prepared substrate surface 26. The four basic parameters that dictate the prepared substrate surface profile are blast media particle shape, blast media particle size, blast media particle velocity (which is determined primarily by the nozzle characteristic and the operating pressure of the blast machinery, and which can be affected by the feed rate of blast media), and angularity of the particle stream in relation to the workpiece. In roughening a substrate surface for receipt of tungsten disulfide, preferred materials and ranges include:

a. Blast Media Grit Types: Aluminum Oxide or Silicon Carbide;
b. Blast Media Grit Sizes: greater than 400 grit (and more preferably greater than or equal to 800 grit up to about 2400 grit);
c. Gun Pressure: 50–200 psi;
d. Blast media carrier gasses: compressed air or pressurized nitrogen (The advantage of nitrogen is to prevent the possibility of surface oxidation during surface prep and tungsten disulfide coating operations; surface oxidation is detrimental to tungsten disulfide bond properties).

Once the substrate surface area 22 has been blasted to provide the formed pockets 28 over the now prepared surface 26, then the pockets 28 are filled with tungsten disulfide particles 32. Air blasting or high velocity impingement of tungsten disulfide particles 32 over the prepared surface 26 is the preferred method of filling tungsten disulfide particles 32 into the formed pockets 28. The result is a tungsten disulfide layer 32 that is about one tungsten disulfide particle thick, with a majority of tungsten disulfide particles 32 projecting from the formed pockets 28 to form a sliding surface for external interaction. Substrate surface areas between adjacent pockets may be exposed, but are generally recessed between the tungsten disulfide particles 32.

Figure 8:
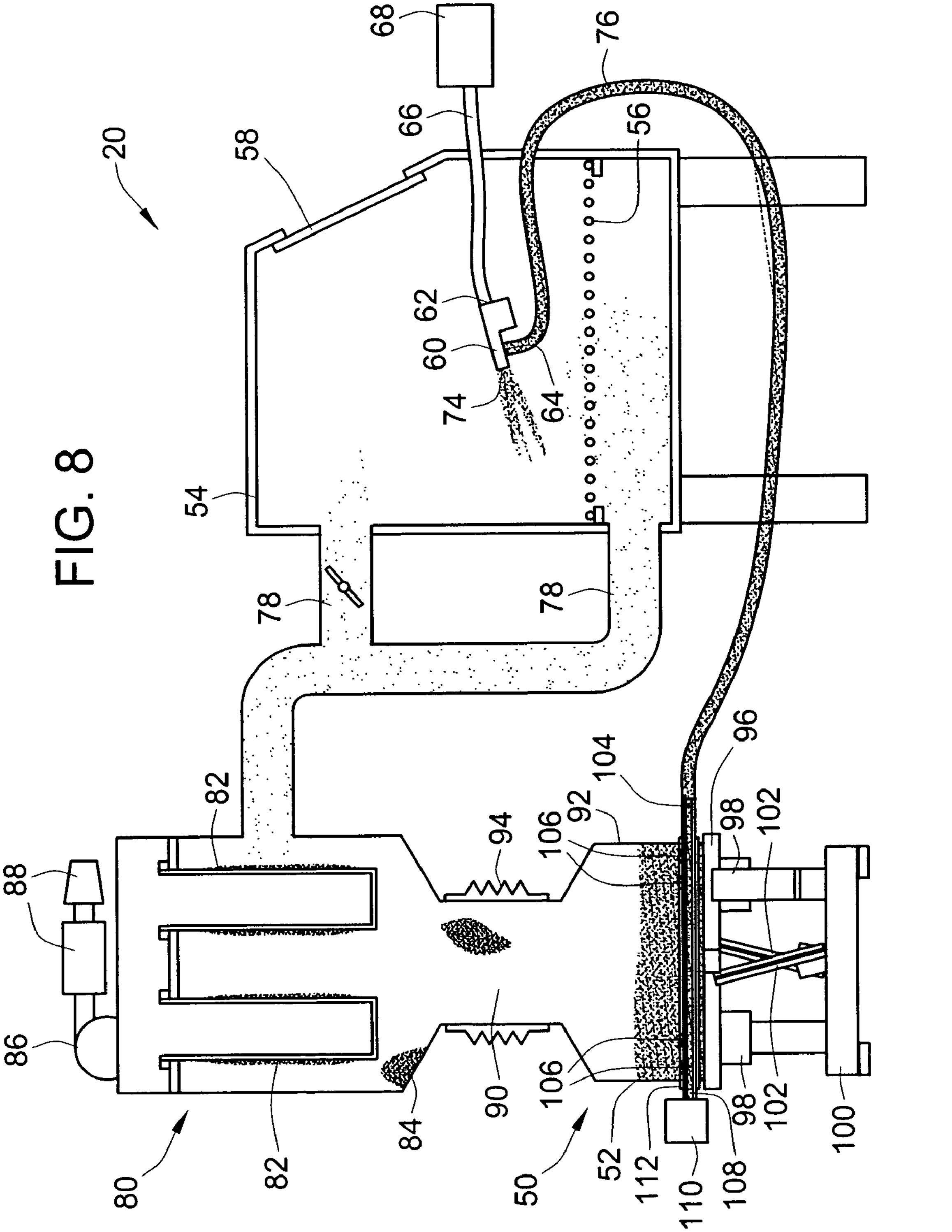
FIG. 8 is a partially schematic cross sectional view of a sand blast machine that enables use of smaller blast media particle sizes according to the present invention.

As indicated above, the sand blast machine 20 enabled the use of smaller grit blast media and thereby the foregoing inventive aspects of the present invention. Turning to FIG. 8, a partly schematic cross section of an embodiment of the sand blast machine 20 is illustrated according to a further aspect of the present invention. The sand blast machine 20 includes several conventional components which will be briefly described, in combination with a vibratory bowl assembly 50 which, as will be described further below, serves as an agitator to fluidize blast media 52 to allow for control and consistency over blast media density/feed rates. The embodiment illustrated is shown as one where workpieces are blasted manually, although for high volume production, blasting operations could be automated.

Referring to FIG. 8, the blast machine 20 includes a blast cabinet 54 which may include a grate 56 upon which workpieces may be placed for blasting and a glass window 58 which allows for viewing of blasting activity by a worker.

Figure 11:
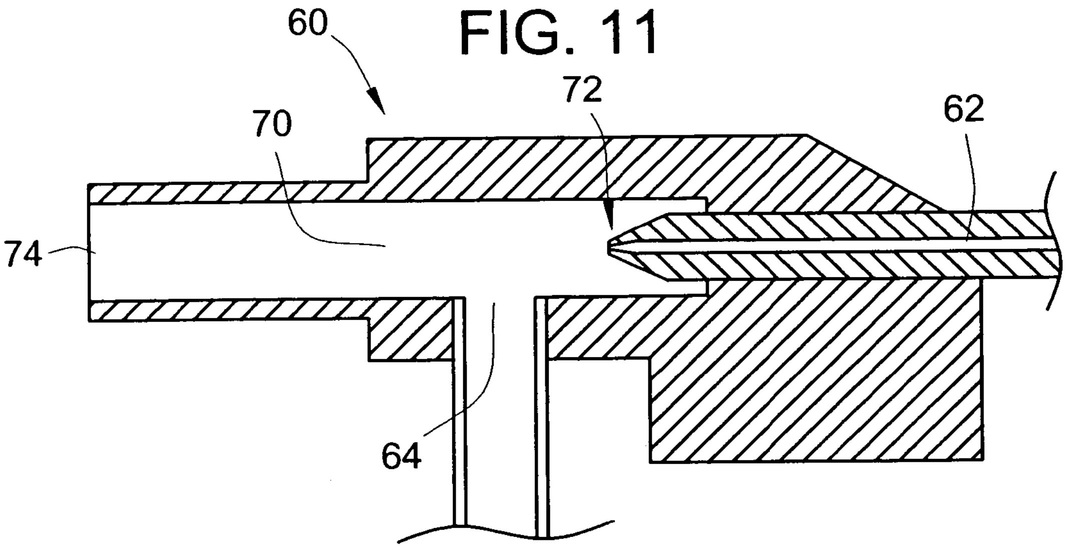
FIG. 11 is a schematic cross sectional view of the spray gun of the sand blast machine shown in FIG. 8.
Figure 12:
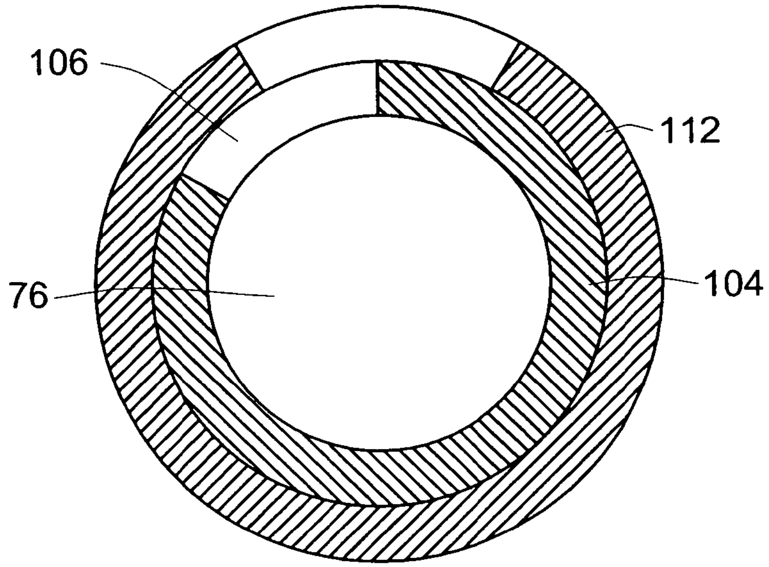
FIG. 12 is a cross section of the intake pipe and shroud of the vibratory bowl assembly shown in FIG. 9.
Figure 13:
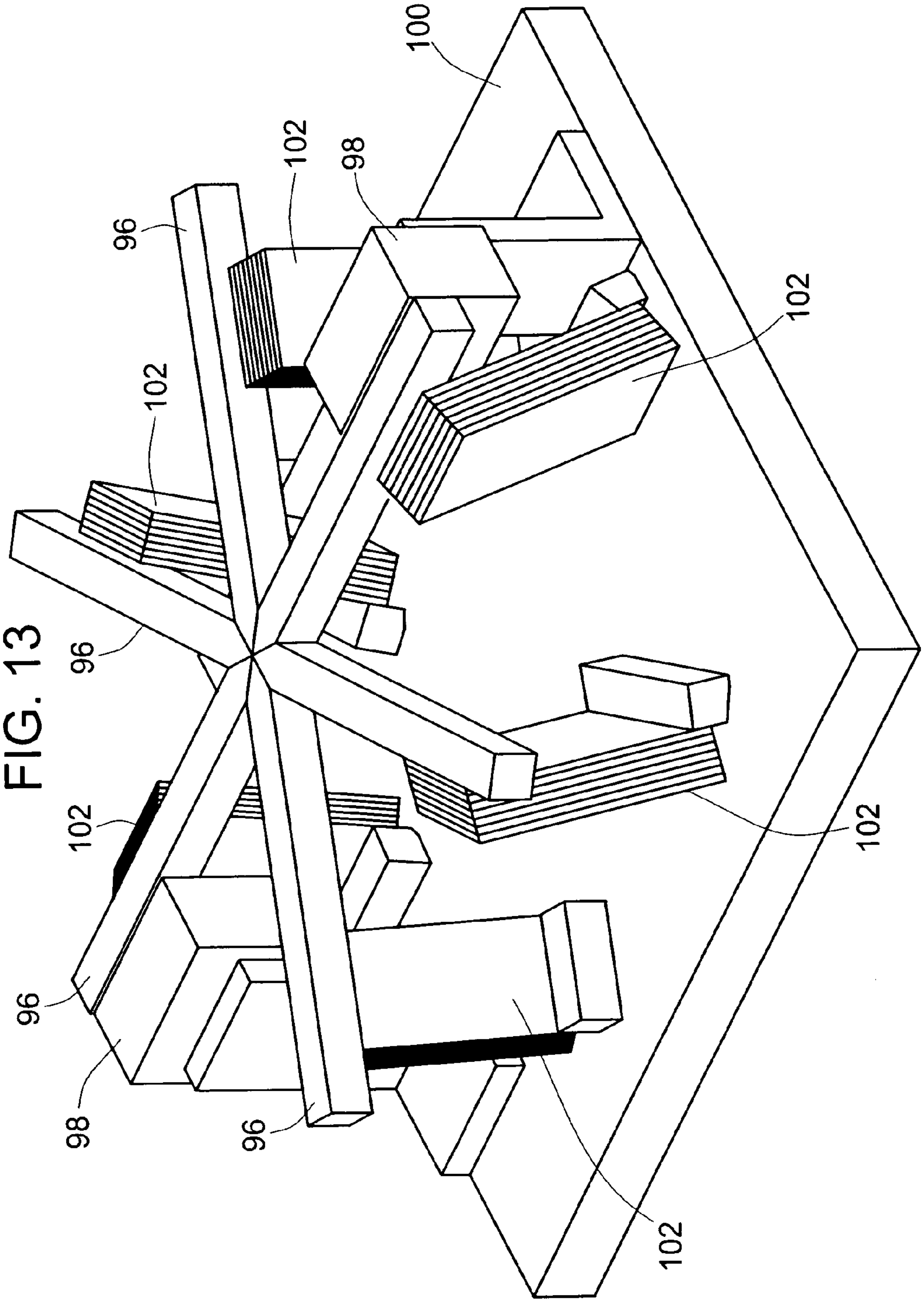
FIG. 13 is a perspective view of a moveable frame for supporting the vibratory bowl of the vibratory bowl assembly of FIG. 9.
Figure 14:
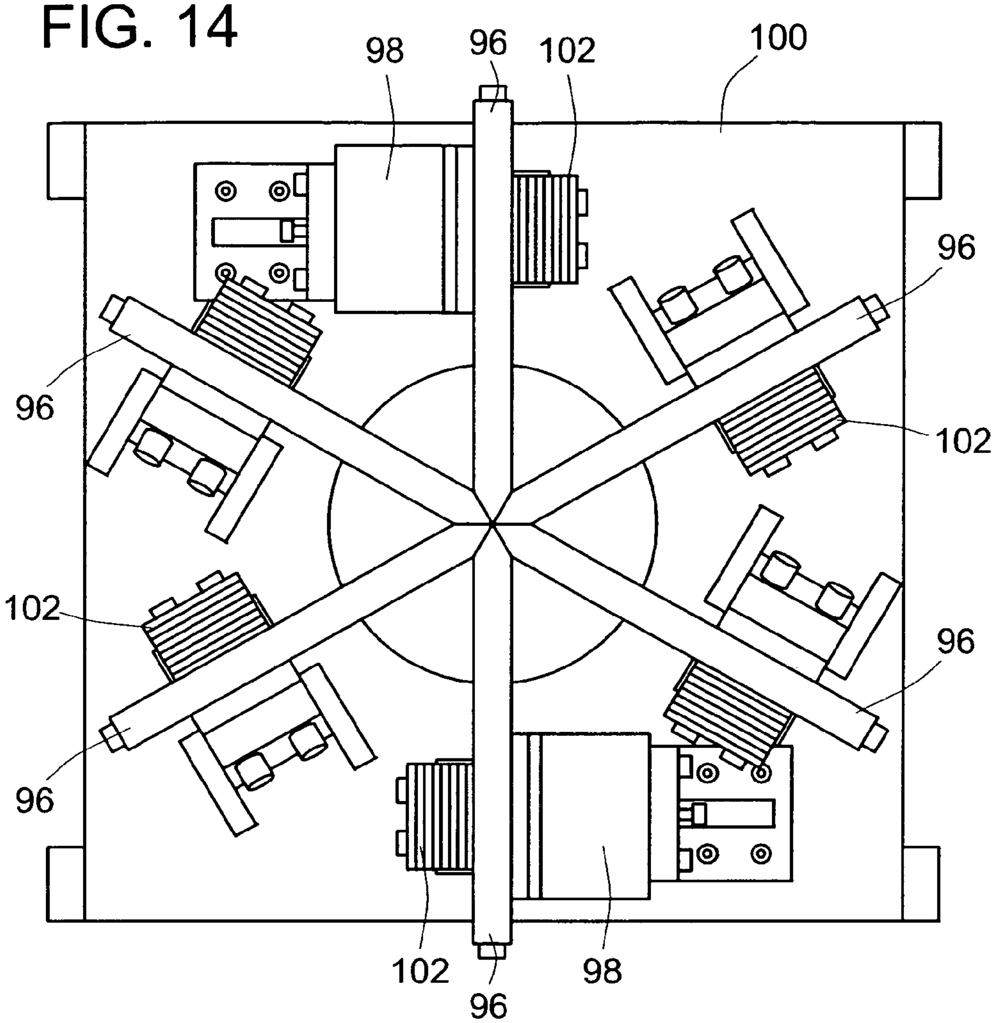
FIG. 14 is a top plan view of the moveable frame of FIG. 13.
Figure 15:
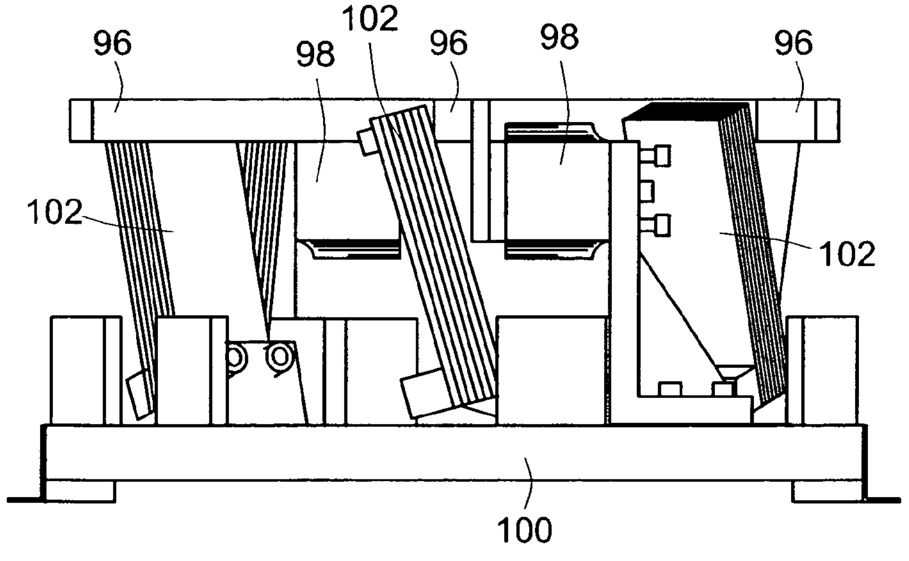
FIG. 15 is a side elevation view the moveable frame of FIG. 14.

A spray gun 60 in the cabinet 54 is provided for spraying workpieces with blast media 52. As shown in FIGS. 8 and 11, the spray gun 60 includes a first input port 62 for receipt of high pressure carrier gas and a second input port 64 for receipt of blast media 52. As shown in the disclosed embodiment, the first input port 62 is connected via a carrier gas conduit 66 to a blower 68 which pressurizes air. The conduit 66 transmits pressurized air to a nozzle 72 where pressurized air enters an internal venture chamber 70 within the gun 60. The nozzle 72 is directed toward a discharge outlet 74 of a larger diameter such that as pressurized air flows through the nozzle 72 suction is created at the second input port 64 to suck or draw blast media through a blast media conduit 76. Carrier gas and blast media mix in the venturi chamber 70 where it is discharged through the discharge outlet 74 and over the workpiece. As noted above, the pressure of carrier gas and the geometry of the spray gun (e.g. the sizing of nozzle and ports) greatly affects and generally determines the blast media stream exiting the discharge outlet 74.

The blast cabinet 54 includes one or more media outlets 78 that are connected to a media collector/separator 80. The collector/separator 80 includes a plurality of tubular filter elements 82 contained within a hopper 84. The tubular filter elements 82 are connected to a blower 86 which sucks the carrier gas through the filter elements 82 and discharges the spent carrier gas to a vent or a muffler and/or filter 88 as shown. Used blast media 52 collects on the outside of the filter elements 82 where it periodically drops down into the hopper 84 (which may be assisted through pulsating of air pressure and suction generated by the blower 86). Used blast media 52 collects in the bottom of the hopper 82 where it is recycled for use through a hopper outlet 90.

Figure 9:
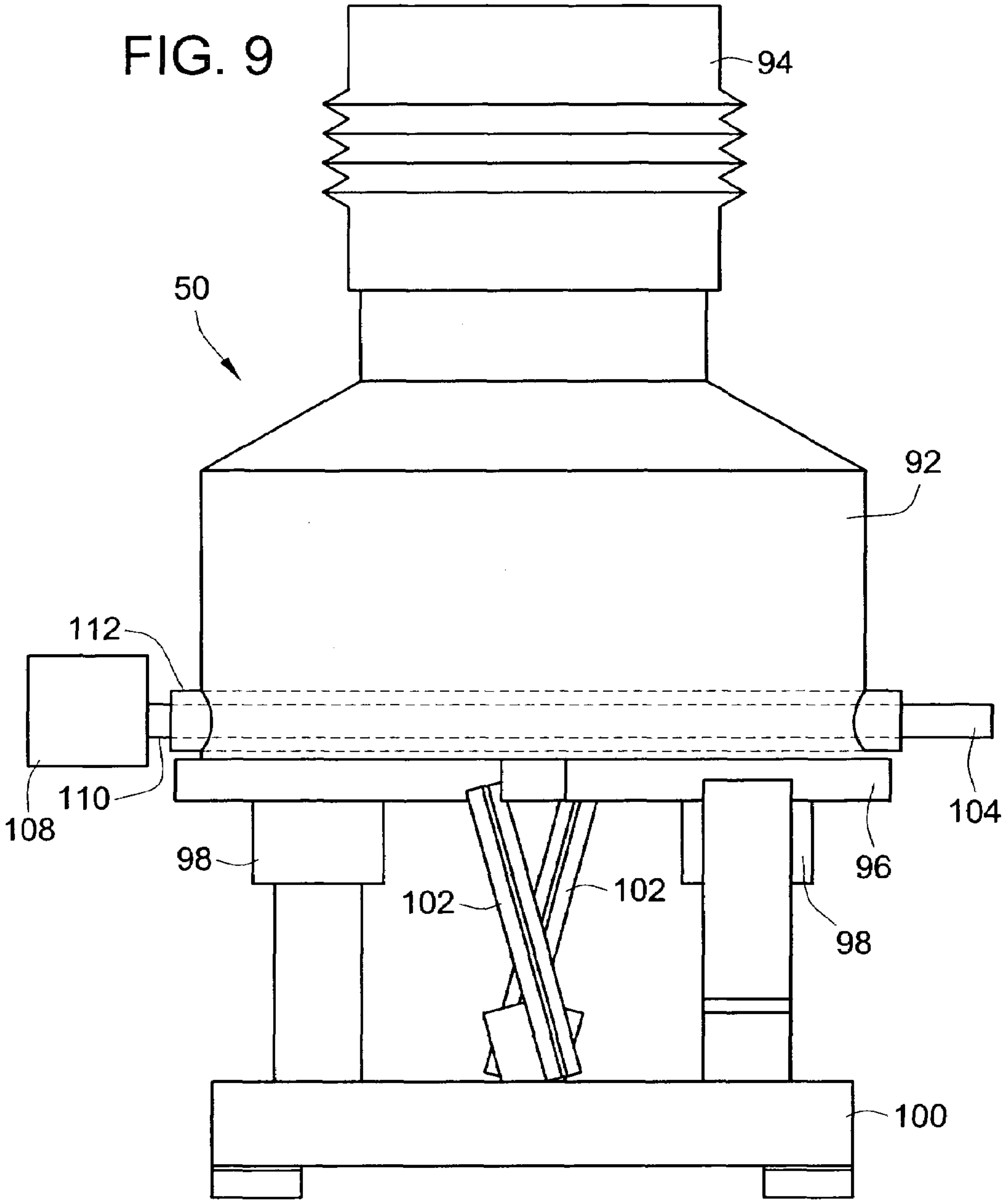
FIG. 9 is a side view of a vibratory bowl assembly of the sand blast machine shown in FIG. 8.
Figure 10:
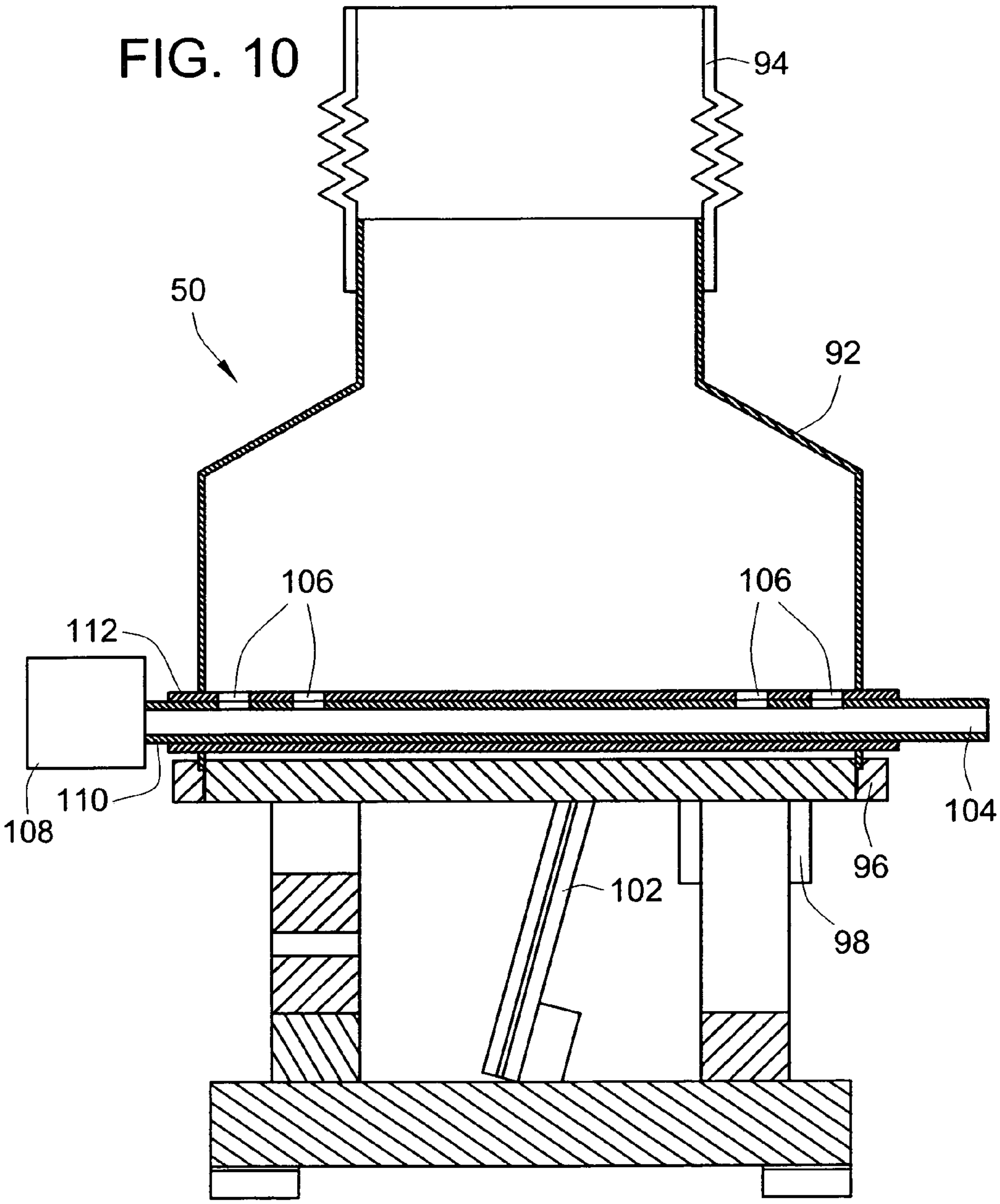
FIG. 10 is a cross section of the vibratory bowl assembly shown in FIG. 9.

In accordance with an aspect of the present invention, and referring to FIGS. 8–10, the vibratory bowl assembly 50 is connected to the hopper outlet 90 where media agitated and fluidized for intake into blast media conduit 76. In the disclosed embodiment, the vibratory bowl assembly 50 includes a vibratory bowl 92 connected to the hopper outlet 90 via a flexible collar 94 to allow for relative movement between the hopper 82 and the bowl 92. The vibratory bowl 92 is supported on a movable frame 96. The movable frame 96 is driven and vibrated by high frequency electrical coils or solenoids 98 which are mounted on a fixed frame 100. The solenoids 98 work against a suitable bias such as springs or resilient rubber supports 102 which act against the action of the solenoids 98. This arrangement causes the vibratory bowl 92 to vibrate (e.g. rotate a small angular amount very quickly back and forth) in order to agitate and fluid blast media 52 contained in the vibratory bowl 92. The vibratory bowl 92 may include internal perforated baffles (not shown) if media does not spread out sufficiently inside the bowl.

Although one embodiment of the vibratory bowl assembly 50 is illustrated, other embodiments are envisioned. For example, instead of solenoids, electrical, pneumatic or hydraulic motors may be used to provide the vibratory motion. A different vibration mechanism may also be used. For example, a rotary motor mounted to the underside of a movable bowl (e.g. mounted on springs) with an offset weight could be used to mobilize and vibrate the bowl.

The vibratory bowl assembly 50 also includes an intake pipe 104 running through the vibratory bowl 92. The intake pipe 104 includes one or more inlet ports 106 exposed to the inside of the bowl 92. The intake pipe 104 also preferably includes a carburetor inlet 108 external to the bowl 92 that allows for air rather than blast media to be drawn through the intake pipe 104. A throttle 110 controls and regulates air flow through the carburetor inlet 108. Typically, the throttle 110 will be set to allow a moderate, substantially uniform flow of blast media to the spray gun to allow for good visibility in the blast cabinet 54. The throttle 110 can be tweaked or adjusted to make adjustments to the blast media feed rate as necessary to provide a proper balance between visibility and feed rate. A second media control may also be provided in the form of a movable shroud 112 that can variably cover inlet ports 106 of the intake pipe 104. The shroud 112 can be rotated or linearly moved relative to intake pipe 104 to change the degree of opening of the inlet ports 106 between fully opened, closed or various partially opened positions. A dial or other indicating device (not shown) may be provided to indicate the percentage that the inlet ports 106 are open.

The intake pipe 104 is connected to the blast media conduit 76 to convey blast media 52 to the spray gun 60.

In operation, the vibratory bowl 92 is vibrated to agitate and fluidize the blast media 52 within the bowl 92. This prevents caking up of blast media micropowders of greater than 400 grit in the vibratory bowl 92. In fact, tiny particle blast media over the preferred range of 800–2400 grit is readily enabled with this invention. The suction created by the venturi chamber 70 is transmitted through the blast media conduit 76 and intake pipe 104 where the suction draws fluidized blast media 52 into the intake pipe 104 where it is suctioned to the spray gun 60.

Typical applications for tungsten disulfide include internal combustions engine components, powertrain components (e.g. gears, bearings, shafts, etc.).

New applications for tungsten disulfide are also disclosed herein which have been conceived. For example, tungsten disulfide can be used to coat drill bits, milling tools and other such cutting tools. Cutting tools coated with tungsten disulfide improves chip evacuating and eliminates pick-up and galling on the cutting tools. Another application is coating threaded screws and other fasteners with tungsten disulfide. Stainless steel screws when coated with tungsten disulfide have the ability to be easily reversed out of a formed hole, even when screwed into stainless steel material (stainless on stainless). Another application includes use on injection molds to aid in mold release, to extend mold life and to improve flow of molten material. Another use is on hydraulic and pneumatic system components (e.g. motors, pumps and valves) to reduce wear and sealing surfaces. Linear motion components such as linear screws, balls screws, acme screws and the like for both lubricated and non-lubricated components. Air conditioning compressor pumps can also be coated with tungsten disulfide.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A tungsten disulfide treated surface over an entire selected area of a substrate material, the tungsten disulfide treated surface including tungsten disulfide particles of a predetermined average size, the tungsten disulfide surface treatment comprising:

a prepared substrate surface formed in the substrate material, the prepared substrate surface having formed pockets with an effective depth substantially matched to or smaller than the predetermined average size of the tungsten disulfide particles over substantially the entire selected area; and a tungsten disulfide layer formed of the tungsten disulfide particles filled into the formed pockets over the entire selected area of the substrate material.

2. The tungsten disulfide treated surface of claim 1 wherein the tungsten disulfide particles have an average size of between about 0.75 micron and about 1.5 micron in diameter.

3. The tungsten disulfide treated surface of claim 2 wherein the formed pockets have an average roughness characteristic measured by a 5 micron radius tip profolometer of between about 2 and about 5 microinches, thereby to provide an effective depth substantially matched to or smaller than the predetermined average size.

4. The tungsten disulfide treated surface of claim 1 wherein the formed pockets have an average roughness characteristic measured by a 5 micron radius tip profilometer of less than about 10 microinches, thereby to provide an effective depth substantially matched to a smaller than the predetermined average size.

5. The tungsten disulfide treated surface of claim 1 wherein the prepared surface comprises a blasted surface.

6. The tungsten disulfide treated surface of claim 1 wherein the substrate material comprises a material selected from the group consisting of ferrous material; stainless steel, aluminum and aluminum alloys; copper and copper alloys; brass; or bronze; and brass or bronze alloys.

7. The tungsten disulfide treated surface of claim 1 wherein the tungsten disulfide layer is about one tungsten disulfide particle thick.

8. The tungsten disulfide treated surface of claim 1 wherein a majority of the tungsten disulfide particles project outside the formed pockets.

9. The tungsten disulfide treated surface of claim 8 wherein the substrate material is exposed between adjacent pockets, the tungsten disulfide particles preventing exposed substrate material from being slidably engaged.

10. The tungsten disulfide treated surface of claim 1 wherein substantially all of said formed pockets are sized to receive a single tungsten disulfide particle of said predetermined average size.

11. A tungsten disulfide treated surface over an entire selected area of a substrate material, the tungsten disulfide treated surface including tungsten disulfide particles of a predetermined average size, the tungsten disulfide treated surface comprising:

a roughened substrate surface formed in the substrate material, the roughened surface having an average roughness characteristic over the entire selected area of less than about 10 microinches as measured by a 5 micron radius tipped profilometer; and a tungsten disulfide layer formed of the tungsten disulfide particles filled into the roughened substrate surface over the entire selected area of the substrate material.

12. The tungsten disulfide treated surface of claim 11 wherein the tungsten disulfide particles have an average size of between about 0.75 micron and about 1.5 micron in diameter.

13. The tungsten disulfide treated surface of claim 12 wherein the roughened surface has an average roughness characteristic measured by a 5 micron radius tip profilometer of between about 2 and about 5 microinches.

14. The tungsten disulfide treated surface of claim 11 wherein the roughened surface has an average roughness characteristic measured by a 5 micron radius tip profilometer of less than about 10 microinches.

15. The tungsten disulfide treated surface of claim 11 wherein the roughened surface comprises a blasted surface.

16. The tungsten disulfide treated surface of claim 11 wherein the tungsten disulfide layer is about one tungsten disulfide particle thick.

17. The tungsten disulfide treated surface of claim 11 wherein the roughened surface defines a plurality of formed pockets, a majority of the tungsten disulfide particles being filled into the formed pockets and projecting outside of the formed pockets.

18. The tungsten disulfide treated surface of claim 17 wherein the substrate material is exposed between adjacent pockets, the tungsten disulfide particles preventing exposed substrate material from being slidably engaged.

* * * * *